United States Patent [19]

Takegawa et al.

[11] Patent Number: 5,141,832
[45] Date of Patent: Aug. 25, 1992

[54] ELECTROPHOTOGRAPHIC PHOTORECEPTOR WITH COPOLYMERIZED POLYCARBONATE RESIN

[75] Inventors: Ichiro Takegawa; Kiyokazu Mashimo; Yasuo Sakaguchi; Makoto Takemoto, all of Kanagawa, Japan

[73] Assignee: Fuji Xerox Co., Ltd., Tokyo, Japan

[21] Appl. No.: 592,626

[22] Filed: Oct. 4, 1990

[30] Foreign Application Priority Data

Nov. 8, 1989 [JP] Japan .................................. 1-288717

[51] Int. Cl.$^5$ .............................................. G03G 5/05
[52] U.S. Cl. ...................................................... 430/96
[58] Field of Search ............................. 430/58, 59, 96

[56] References Cited

U.S. PATENT DOCUMENTS 4,637,971  1/1987  Takei et al. .......................... 430/96
4,851,314  7/1989  Yoshihara ............................. 430/96

Primary Examiner—John Goodrow
Attorney, Agent, or Firm—Finnegan, Henderson, Farabow, Garrett and Dunner

[57] ABSTRACT

An electrophotographic photoreceptor excellent in durability is disclosed, which has a conductive substrate having provided thereon a photosensitive layer, wherein said photosensitive layer contains a copolymerized polycarbonate resin comprising repeating units represented by structural formula (I) and repeating units represented by structural formula (II) as a binder resin:

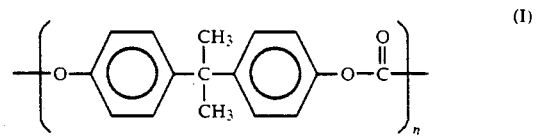

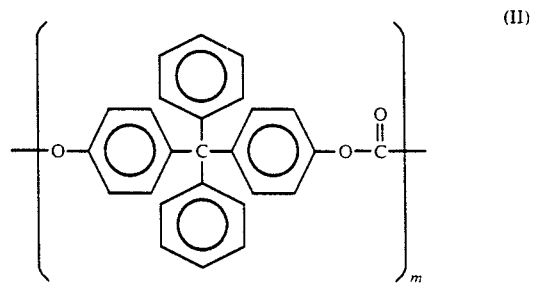

wherein $m/(n+m)$ is from 0.1 to 0.9 by molar ratio.

4 Claims, No Drawings

ELECTROPHOTOGRAPHIC PHOTORECEPTOR WITH COPOLYMERIZED POLYCARBONATE RESIN

FIELD OF THE INVENTION

The present invention relates to an electrophotographic photoreceptor, and more particularly to an electrophotographic photoreceptor containing a specific polycarbonate resin as a binder resin.

BACKGROUND OF THE INVENTION

In recent years, electrophotographic techniques have been widely utilized in the fields of copying machines and laser beam printers, because they have the advantage of high speed and high quality printing.

As electrophotographic photoreceptors used in these electrophotographic techniques, there have previously been widely known electrophotographic photoreceptors using inorganic photoconductive materials such as selenium, selenium-tellurium alloys, selenium-arsenic alloys and cadmium sulfide. On the other hand, compared to the electrophotographic photoreceptors using these inorganic photoconductive materials, electrophotographic photoreceptors using organic photoconductive materials have the advantages of being inexpensive and being excellent in productivity and easiness of waste disposal. The research of such electrophotographic photoreceptors have also become active. In particular, organic photoreceptors of a functionally separated laminate type comprising charge-generating layers for generating charge by exposure and charge-transporting layers for transporting charge, the charge-generating layers and the charge-transporting layers being laminated, are excellent in electrophotographic characteristics such as sensitivity, charging property and their stability on repeated use. For such organic photoreceptors, various proposals have hitherto been submitted and put to practical use.

When a photosensitive layer is formed by a coating procedure using a binder resin formerly proposed, an electrophotographic photoreceptor having somewhat sufficient durability can be obtained. The mechanical strength of its surface layer is however not necessarily sufficient. When the electrophotographic photoreceptor is repeatedly used in a copying machine for a long period of time, the surface of the photosensitive layer wears away, whereby the film thickness of the photoreceptor varies to decrease the sensitivity. As a result, there is the problem that fog is produced on copied images, or that charge potential is lowered to reduce the density of the copied images. For the electrophotographic photoreceptors, therefore, it has hitherto been desired to develop such a binder resin as forms a photosensitive layer having sufficient durability.

When such an electrophotographic photoreceptor is used in a high speed copying machine, not only the sensitivity of the electrophotographic photoreceptor is required to be high, but also the rapid decay of photoreceptor potential is needed. This means that it is necessary that carriers are rapidly injected from the charge-generating layer and the ability for transfer of the carriers in the charge-transporting layer is high. However, the charge-transporting layer formed by adding a charge-transporting material to the prior-art binder resin could not be said to have sufficient light decay characteristics compatible for all kinds of high-speed copying machines. It is the idea traditionally generally accepted that the transportability of the carriers is controlled by selection of the charge-transporting material and by the compounding amount thereof. Accordingly, the approach of finding out a binder resin effective to an improvement in charge transportability has not been sufficiently made.

SUMMARY OF THE INVENTION

It is therefore an object of the present invention to solve the above problems in the prior art and to provide an electrophotographic photoreceptor whose surface has high strength and which is excellent in durability when it is repeatedly used.

As a result of various studies in binder resins for the photosensitive layers, the present inventors have discovered that copolymerized polycarbonate resins comprising repeating units represented by the following structural formula (I) and repeating units represented by the following structural formula (II) have very excellent durability relating to mechanical strength to solve the problem of mechanical deterioration of the photosensitive layers and far improve charge-transporting capability.

The present invention provides an electrophotographic photoreceptor comprising a conductive substrate having provided thereon a photosensitive layer, wherein said photosensitive layer contains a copolymerized polycarbonate resin comprising repeating units represented by the following structural formula (I) and repeating units represented by the following structural formula (II) as a binder resin:

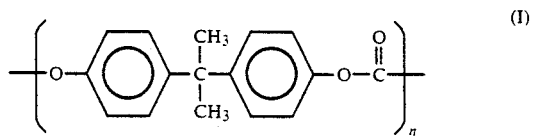

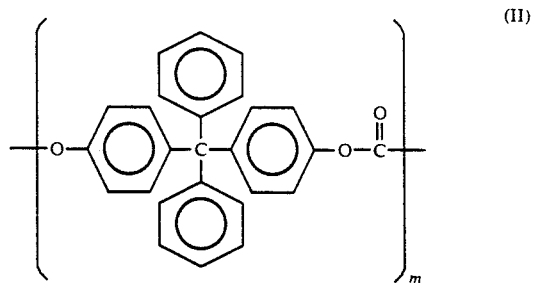

wherein $m/(n+m)$ is from 0.1 to 0.9 by molar ratio.

DETAILED DESCRIPTION OF THE INVENTION

The present invention will hereinafter be described in detail.

In the electrophotographic photoreceptors of the present invention, as the conductive substrates are used known materials such as metal drums formed of aluminum, copper, iron, zinc, nickel and the like, and drum-like, sheet-like or plate-like conductive materials obtained by depositing metals such as aluminum, copper, gold, silver, platinum, palladium, titanium, nickel-chromium, stainless steel and copper-indium over sheets, paper, plastics or glass, by laminating metal foil thereon, or by applying binder resins containing carbon black, indium oxide, tin oxide-antimony oxide powders, metal powders, copper iodide and the like therein.

Further, the surfaces of the conductive substrates can be variously treated as needed as long as the image quality is not affected thereby. For example, the surfaces can be subjected to oxidation treatment, chemical treatment, coloring treatment and the like.

The surfaces of the above conductive substrates may be provided with under coating layers having a barrier function or an adhesive function as needed. As materials constituting the under coating layers, there can be used resins such as polyvinyl butyral, polyvinyl alcohol, casein, polyamides, cellulose, gelatin, polyurethanes and polyesters; and metal oxides such as aluminum oxide. The under coating layers generally have a thickness of 0.01 to 5 $\mu$m, preferably 0.05 to 2 $\mu$m.

The photosensitive layers formed on the conductive substrates may be of single layer structure or of laminate structure in which the photosensitive layers are functionally divided into charge-generating layers and charge-transporting layers. In the case of the laminate structure, either the charge-generating layers or the charge-transporting layers may constitute the upper layers.

Charge-generating materials used for the photosensitive layers include inorganic photoconductive materials such as amorphous selenium, crystalline selenium such as trigonal selenium, selenium-tellurium alloys, selenium-arsenic alloys, other selenium compounds and their alloys, amorphous silicon, zinc oxide and titanium oxide; organic pigments such as phthalocyanine pigments, squarylium pigments, anthanthrone pigments, perylene pigments, azo pigments, anthraquinone pigments, pyrene pigments, pyrylium salts and thiapyrylium salts; and dyes.

Charge-transporting materials include electron-donating materials (e.g., oxadiazole derivatives such as 2,5-bis-(p-diethylaminophenyl)-1,3,4-oxadiazole; pyrazoline derivatives such as 1,3,5-triphenylpyrazoline and 1-[pyridyl-(2)]-3-(p-diethylaminostyryl) -5-(p-diethylaminostyryl)pyrazoline; aromatic tertiary amino compounds such as triphenylamine and dibenzylaniline; aromatic tertiary diamino compounds such as N,N,-diphenyl-N,N,-bis(3-methylphenyl)-[1,1,-biphenyl]-4,4,-diamine; 1,2,4-triazine derivatives such as 3-(4-dimethylaminophenyl) -5,6-di-(4,-methoxyphenyl)-1,2,4-triazine; hydrazone derivatives such as 4-diethylaminobenzaldehyde -1,1-diphenylhydrazone; quinazoline derivatives such as 2-phenyl-4-styrylquinazoline; benzofuran derivatives such as 6-hydroxy-2,3-di-(p-methoxyphenyl)-benzofuran; α-stilbene derivatives such as p-(2,2-diphenylvinyl) -N,N-diphenylaniline; enamine derivatives; carbazole derivatives such as N-ethylcarbazole; polyvinylcarbazole derivatives such as poly-N-vinylcarbazole; and poly-γ-carbazolylethyl glutanate derivatives); electron attractive materials (e.g., quinone compounds such as p-benzoquinone, chloranil, bromanil and anthraquinone; tetracyanoquinodimethane compounds; fluorenone compounds such as 2,4,7-trinitrofluorenone; xanthone compounds; benzophenone compounds; cyanovinyl compounds; and ethylene compounds); and polymers whose main chains or side chains have groups consisting of the compounds described above.

In the present invention, the above copolymerized polycarbonate resins are used as the binder resins used for the photosensitive layers. When the photosensitive layer has the laminate structure in which the photosensitive layer is functionally divided into the charge-generating layer and the charge-transporting layer, the above copolymerized polycarbonate resin may be used as the binder resin of either of the charge-generating layer and the charge-transporting layer. In particular, the copolymerized polycarbonate resin is preferably used as the binder resin of the charge-transporting layer.

In the above copolymerized polycarbonate resins used in the present invention, the repeating units represented by the above structural formula (I) are copolymerized with the repeating units represented by the above structural formula (II) in molar ratios of 10:90 to 90:10, preferably 15:85 to 60:40. The copolymerized polycarbonate resins have a viscosity-average molecular weight in the range of 10,000 to 200,000, preferably 20,000 to 100,000, can be used.

The above copolymerized polycarbonate resins can be produced by various methods. For example, the copolymerized polycarbonate resin can be produced by polycondensation of 4,4'-dihydroxyter aphenylmethane and 2,2,-bis(4-hydroxyphenyl) propane(bisphenol A) with phosgene. In addition to such a phosgene method, the copolymerized polycarbonate resin can also be produced by the ester interchange method using diphenyl carbonate and the like. In such cases, 4,4'-dihydroxytetraphenylmethane and bisphenol A may be directly mixed with each other as monomers, and then reacted with phosgene or diphenyl carbonate, or 4,4'-dihydroxytetraphenylmethane may previously be polycondensed with phosgene or diphenyl carbonate to form an oligomer, followed by reaction of this oligomer with bisphenol A. Conversely, bisphenol A may previously be polycondensed with phosgene or diphenyl carbonate, followed by reaction with 4,4'-dihydroxytetraphenylmethane. Polycondensation conditions cannot be unequivocally determined by polymerization degrees of the desired copolymers and the like. Usually, catalysts, alkalis, molecular weight regulators and the like may be used in solvents such as halogenated hydrocarbons such as methylene chloride and chlorobenzene, and pyridine. As the molecular weight regulators, various monovalent phenols are used.

In the present invention, when the photosensitive layer has the laminate structure, the charge-generating layer is formed by vacuum deposition of the charge-generating material or by application of the charge-generating material dispersed in an organic solvent together with the binder resin. The organic solvents include alcohols such as ethanol, n-butyl alcohol and isobutyl alcohol, ketones such as methylethyl ketone and cyclohexanone, and acetic acid esters such as ethyl acetate, butyl acetate and isoamyl acetate.

When the binder resins are used in the charge-generating layers, the binder resins include the following resins in addition to the copolymerized polycarbonate resins described above. Namely, such resins include polycarbonate resins of a bisphenol A type or a bisphenol Z type, butyral resins, polyester resins, phenoxy resins, methacrylic resins, acrylic resins, polyvinyl chloride resins, polystyrene resins, polyvinyl acetate resins, styrene- butadiene copolymer resins, vinylidene chloride-acrylonitrile copolymer resins, vinyl chloride-vinyl acetate-maleic anhydride resins, silicone resins, silicone-alkyd resins, phenol-formaldehyde resins, styrene-alkyd resins and poly-N-vinylcarbazole. These binder resins can be used alone or in combination of two or more.

The mixing ratio (by weight) of the charge-generating material to the binder resin is preferably 20:1 to 1:20. Further, the film thickness of the charge-generating layer is established generally within the range of 0.01 to 5 μm, preferably within the range of 0.05 to 20 μm.

The charge-transporting layer can be formed by coating a solution obtained by dissolving the above charge-transporting material and the above copolymerized polycarbonate resin in an appropriate solvent and by drying the solution. Examples of the solvents used for formation of the charge-transporting layers include aromatic hydrocarbons such as benzene, toluene and chlorobenzene; ketones such as acetone and 2-butanone; halogenated aliphatic hydrocarbons such as methylene chloride, chloroform and ethylene chloride; cyclic or straight-chain ethers such as tetrahydrofuran, dioxane, ethylene glycol diethyl ether; and mixed solvents thereof.

The compounding ratio of the charge-transporting material to the above copolymerized polycarbonate resin is preferably 10:1 to 1:5. Further, the film thickness of the charge-transporting layer is established generally within the range of 5 to 50 μm, preferably within the range of 10 to 30 μm.

The present invention will be described in more detail with reference to the following examples and comparative examples. It is understood of course that these are not intended to limit the scope of the invention.

EXAMPLE 1

An aluminum film having a thickness of about 500 Å was formed on the surface of a conductive polyethylene terephthalate film by vacuum deposition, and a coating solution containing 10 parts by weight of a polyamide resin, 150 parts by weight of methanol and 40 parts by weight of water was coated thereon, followed by drying to form an under coating layer having a film thickness of 1 μm. Further, a mixture of 9 parts by weight of trigonal selenium (manufactured by Xerox Corporation, U.S.A.), 2 parts by weight of a polyvinyl butyral resin (S-LEC BM-1, manufactured by Sekisui Chemical Co., Ltd.) and 30 parts by weight of n-butyl alcohol was placed in a ball mill pot, and milled for 60 hours using ⅛ inch diameter SUS balls as mill members. Then, 30 parts by weight of n-butyl alcohol was further added thereto for dilution, followed by stirring to obtain a coating solution. This coating solution was applied to the under coating layer described above, and then dried to form a charge-generating layer having a film thickness of 0.3 μm. Then, 4 parts by weight of N,N,-diphenyl-N,N-bis(3-methylphenyl)-[1,1'-biphenyl]-4,4'-diamine and 6 parts by weight of a copolymerized polycarbonate resin having a viscosity-average molecular weight of 45,000 and an n:m molar ratio in the above structural formulae (I) and (II) of 2:8 were added to 40 parts by weight of tetrahydrofuran and 15 parts by weight of methylene chloride to solve them. The resulting solution was applied to the charge-generating layer described above, and then dried to form a charge-transporting layer having a film thickness of 20 μm. An electrophotographic photoreceptor consisting of three layers was thus produced.

The electrophotographic photoreceptor thus obtained was loaded in a copying machine (FX-5075, manufactured by Fuji Xerox Co., Ltd.). The exposure to the photoreceptor was varied by placing originals whose density was changed stepwise on a document table of the copying machine, and the change in surface potential at that time was examined. In addition, using this copying machine, copying running tests were carried out up to 100,000 copies. The results are shown in Table 1.

EXAMPLE 2

An electrophotographic photoreceptor was produced as with Example 1 except that a copolymerized polycarbonate resin having an n:m molar ratio in the above structural formulae (I) and (II) of 1:1 and a viscosity-average molecular weight of 30,000 was used as the binder resin of the charge-transporting layer, and similarly evaluated. The results are shown in Table 1.

COMPARATIVE EXAMPLE 1

An electrophotographic photoreceptor was produced as with Example 1 except that a copolymerized polycarbonate resin consisting of only the repeating units represented by the above structural formula (I) and a viscosity-average molecular weight of 30,000 was used as the binder resin of the charge-transporting layer, and similarly evaluated. The results are shown in Table 1.

COMPARATIVE EXAMPLE 2

An electrophotographic photoreceptor was produced as with Example 1 except that a copolymerized polycarbonate resin consisting of only the repeating units represented by the above structural formula (II) and a viscosity-average molecular weight of 25,000 was used as the binder resin of the charge-transporting layer, and similarly evaluated. The results are shown in Table 1.

TABLE 1

| Example No. | m/(n + m) | Photoreceptor Potential on Use of White Original (Vbg) | Abrasion Loss of Photo-receptor after 100,000 copies | Change in Image Quality during 100,000 copies |
|---|---|---|---|---|
| Example 1 | 0.2 | 64 V | 2.4 μm | No changes |
| Example 2 | 0.5 | 69 V | 2.6 μm | No changes |
| Comparative Example 1 | 0 | 141 V | 2.3 μm | Fog was generated |
| Comparative Example 2 | 1.0 | 62 V | 5.6 μm | Fog and blank areas were generated by repeated use |

As apparent from the results shown in Table 1, the present invention could provide images having high durability and excellent image quality over a long period of time. In contrast, in the case of Comparative Example 1, the potential on use of the white original was increased due to low charge transportability, which resulted in generation of fog on a copied image. In the case of Comparative Example 2, the abrasion loss was large and the generation of fog and blank areas was observed by repeated use.

As apparent from the comparison of the above Examples with the above Comparative Examples, the copolymerized polycarbonate resins comprising the repeating units represented by the above structural formula (I) and the repeating units represented by the above structural formula (II) are used as the binder resins of the photosensitive layers, so that the formed films have high abrasion resistance and high charge transportability. Accordingly, the electrophotographic photoreceptors of the present invention can also be used in high-speed copying machines, and further no problem is encountered even if they are used in belt-like configurations. Thus, electrophotographic photoreceptors of the present invention have high durability. By using the electrophotographic photoreceptors of the present invention, therefore, copied images excellent in image quality can be obtained at high speed and with high stability over a long period of time.

What is claimed is:

1. An electrophotographic photoreceptor comprising a conductive substrate having provided thereon a photosensitive layer, wherein said photosensitive layer contains a copolymerized polycarbonate resin comprising repeating units represented by structural formula (I) and repeating units represented by structural formula (II) as a binder resin:

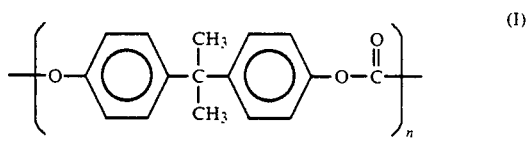

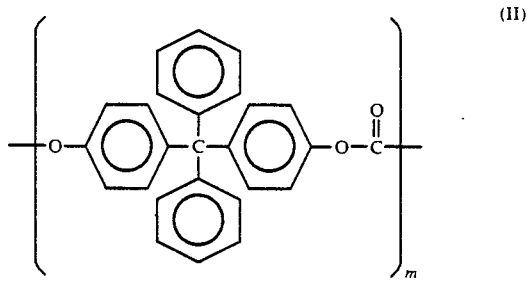

wherein $m/(n+m)$ is from 0.1 to 0.9 by molar ratio.

2. An electrophotographic photoreceptor as in claim 1, wherein $n/(n+m)$ is from 0.4 to 0.85 by molar ratio.

3. An electrophotographic photoreceptor as in claim 1, wherein said copolymerized polycarbonate resin has a viscosity-average molecular weight in the range of 10,000 to 200,000.

4. An electrophotographic photoreceptor as in claim 3, wherein said copolymerized polycarbonate resin has a viscosity-average molecular weight in the range of 20,000 to 100,000.

* * * * *